US008688046B2

(12) United States Patent
Hershey et al.

(10) Patent No.: US 8,688,046 B2
(45) Date of Patent: Apr. 1, 2014

(54) QUIET SPECTRUM HARVESTER

(75) Inventors: John Erik Hershey, Ballston Lake, NY (US); Michael James Hartman, Clifton Park, NY (US); Richard Louis Zinser, Niskayuna, NY (US); John Anderson Fergus Ross, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 412 days.

(21) Appl. No.: 12/392,609

(22) Filed: Feb. 25, 2009

(65) Prior Publication Data

US 2010/0216404 A1 Aug. 26, 2010

(51) Int. Cl.
*H04B 15/00* (2006.01)
*H04B 17/00* (2006.01)

(52) U.S. Cl.
USPC ................. 455/62; 705/37; 705/80; 370/329; 370/431; 370/437

(58) Field of Classification Search
USPC .......... 405/62, 63.1, 167; 705/37, 80; 455/62; 370/329, 431, 437
See application file for complete search history.

(56) References Cited

U.S. PATENT DOCUMENTS 5,548,809 A 8/1996 Lemson
5,745,841 A 4/1998 Reudink et al.
2003/0156603 A1 8/2003 Rakib et al.
2004/0156335 A1 8/2004 Brethour et al.
2005/0250468 A1 11/2005 Lu et al.
2006/0031082 A1* 2/2006 Amaitis et al. .................... 705/1
2006/0239187 A1 10/2006 Durand et al.
2006/0286986 A1* 12/2006 Kim et al. ..................... 455/450
2008/0221951 A1 9/2008 Stanforth et al.
2008/0222019 A1 9/2008 Stanforth et al.
2008/0222020 A1 9/2008 Stanforth et al.
2008/0222021 A1 9/2008 Stanforth et al.
2009/0245119 A1* 10/2009 Kuffner et al. ................ 370/252
2009/0327074 A1* 12/2009 Callaway et al. .......... 705/14.49
2010/0003922 A1* 1/2010 Zhou et al. ................. 455/67.11
2010/0056132 A1* 3/2010 Gallagher .................. 455/422.1
2010/0105400 A1* 4/2010 Palmer ........................... 455/450
2010/0145745 A1* 6/2010 Stanforth et al. ................. 705/7

FOREIGN PATENT DOCUMENTS

WO WO2008109641 9/2008

OTHER PUBLICATIONS

Auer, G. et al.; "Interference Aware Medium Access for Dynamic Spectrum Sharing"; 2nd IEEE International Symposium; vol. 17; Issue 20; pp. 399-402; Apr. 2007.

Huang, J. et al.; "Spectrum Sharing with Distributed Interference Compensation"; Department of ECE, Northwestern University.

(Continued)

*Primary Examiner* — Arnold Kinkead
*Assistant Examiner* — Richard Tan
(74) *Attorney, Agent, or Firm* — Jean K. Testa; Fletcher Yoder, P.C.

(57) ABSTRACT

Present embodiments provide methods and systems for identifying quiet and/or under utilized segments of the radio spectrum and assigning the identified spectrum to non-primary license holders. The methods and systems may include spectrum management nodes for monitoring frequency bands of the radio spectrum for transmission by a primary user. When a primary user is not transmitting, segments of the quiet spectrum may be assigned to a non-primary user.

12 Claims, 7 Drawing Sheets

(56) References Cited

OTHER PUBLICATIONS

Jin, T. et al.; "Game-theoretic Distributed Spectrum Sharing for Wireless Cognitive Networks with Heterogeneous QoS"; Department of Electrical and Computer Engineering; Michigan Technological University, Houghton, MI 49931.

Chen, R. et al.; "Toward Secure Distributed Spectrum Sensing in Cognitive Radio Networks"; Bradley Department of Electrical and Computer Engineering; Sep. 2006.

Kataria, A. et al.; "Congnitive Radios-Spectrum Sensing Issues"; A Thesis presented to the faculty of the graduate school at the University of Missouri-Columbia; pp. 1-54; Dec. 2007.

Nekovee, M.; "Dynamic Spectrum Access-Concepts and Future Architectures"; BT Technology Journal; vol. 24; No. 2; Apr. 2006.

Nan, H. et al.; "Distributed Coordinated Spectrum Sharing MAC Protocol for Cognitive Radio"; 2nd IEEE International Symposium; vol. 17; issue 20; pp. 240-249; Apr. 2007.

Horne, William D.; Adaptive Spectrum Access: Using the Full Spectrum Space; The MITRE Corporation.

* cited by examiner

QUIET SPECTRUM HARVESTER

BACKGROUND

The invention relates generally to radio spectrum use by non-primary users. More specifically, the invention relates to allocating unused portions of the radio spectrum to secondary or additional users.

Wireless communication on the radio spectrum is limited by the amount of unassigned spectrum available to users. Generally, the entire range of the useful spectrum is divided (in the frequency dimension) into blocks or bands of frequencies called allocations. These frequency allocations determine the type of use allowed within the block or band of frequencies. For example, separate allocations are made for broadcasting, land mobile radio, point-to-point microwave, and amateur radio services.

In some, but not all, cases, these allocations are further subdivided into allotments. Broadly, the term refers to the subdivision of bands already allocated to a particular service for specific user and/or provider groups within that service. Within an allocation for the land mobile radio service, for example, allotments might be made for public cellular mobile telephone, mobile radio, and public safety services.

Radio spectrum is commonly assigned to bandwidth users in a zoned fashion, i.e., various primary users are granted reserved blocks of spectrum whether they are continuously transmitting or not. Because few primary users transmit continuously, much of the assigned spectrum is largely quiet. In addition, because the spectrum has historically been used in an analog fashion, the bandwidths of the allocations and/or allotments were distributed in wider bands than may be employed for modern digital communication. The wider bandwidths were assigned in such a manner to prevent interference between adjacent bands in analog communication, which typically involves a higher signal to noise ratio than digital communication and therefore may be more sensitive to interference. Accordingly, the historic allotment of bands was inefficient to some degree. It has therefore been a goal of many telecommunication users to find some way that unused spectrum might be used by secondary users during the periods of non-use by the primary assignees.

Certain proposed approaches for making use of quiet spectrum have been frustrated by complex technical problems including what is termed as "the hidden node" problem in which a non-primary user cannot determine that a recipient of a primary user is receiving. During the transmission, if the non-primary user were to begin transmitting, the primary user's transmission would experience interference. Because of the persistent and unsolved technical problems, national licensing and regulatory authorities have been reluctant to encourage quiet spectrum usage by non-primary users.

BRIEF DESCRIPTION

Drawings

These and other features, aspects, and advantages of the present invention will become better understood when the following detailed description is read with reference to the accompanying drawings in which like characters represent like parts throughout the drawings, wherein.

DETAILED DESCRIPTION

The embodiments disclosed herein provide a quiet spectrum management method and system. As provided, the radio spectrum may be monitored by one of a series of spectrum manager nodes to determine if a primary user is transmitting. If a portion of the assigned spectrum is quiet, a spectrum manager node may receive and grant a request to temporarily assign that portion of quiet spectrum to a non-primary user, i.e., a secondary user. The spectrum manager node may also override use by non-primary users when a primary user begins to transmit. In one embodiment, a spectrum manager node may broadcast information about the available spectrum, without interfacing with or brokering usage by secondary users.

Figure 1:
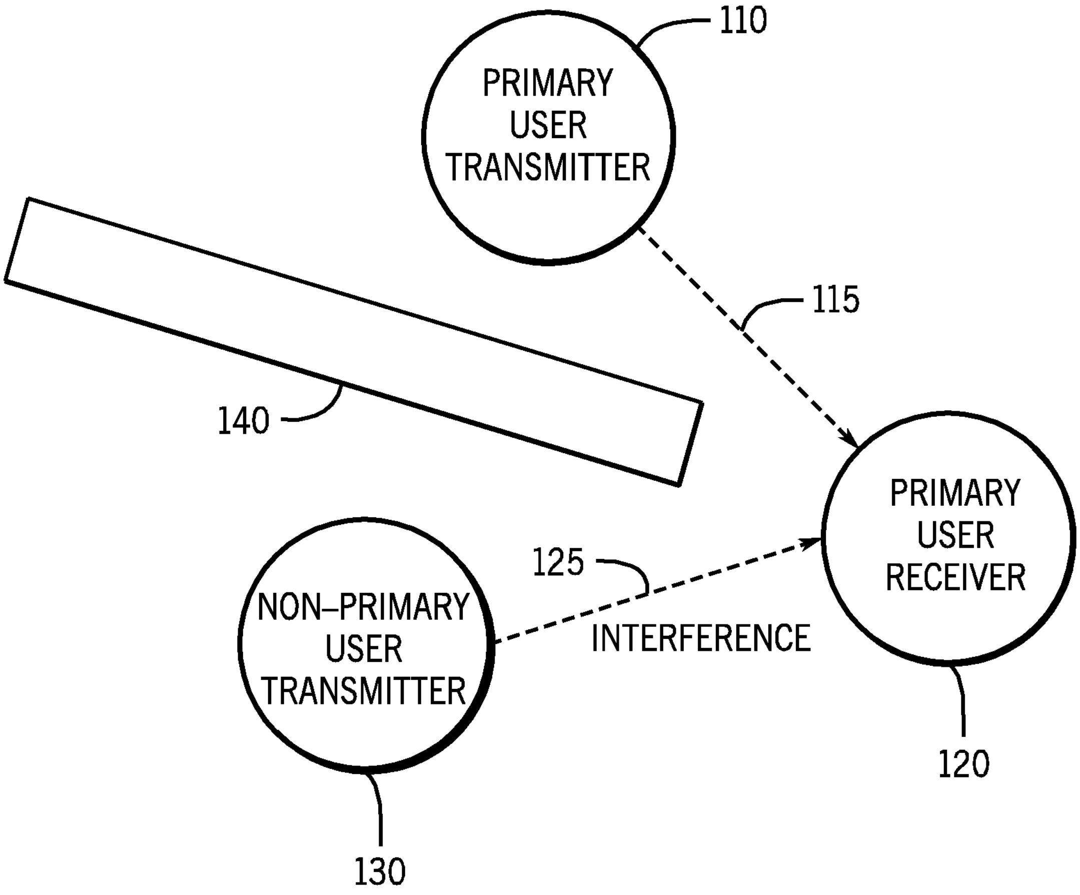
FIG. 1 shows prior art interference between a primary user receiver and a non-primary user transmitter.

The disclosed embodiments overcome difficulties in correctly identifying quiet spectrum that are associated with previous techniques. One disadvantage of previous techniques for harvesting quiet spectrum is the hidden node problem, illustrated in prior art FIG. 1. As depicted, a primary user transmitter 110 transmits by path 115 to a primary user receiver 120. The primary user receiver 120 is receiving and is silent. A non-primary user transmitter 130 wishes to transmit and cannot detect a transmission from the primary user transmitter 110 because of an RF obstruction 140. Because the non-primary user transmitter 130 cannot detect the presence of transmissions from the primary user transmitter 110, the non-primary user transmitter 130 may mistakenly transmit. As a result, an RF path 125 from the non-primary user transmitter 130 to the primary user receiver 125 interferes with the primary user.

Figure 2:
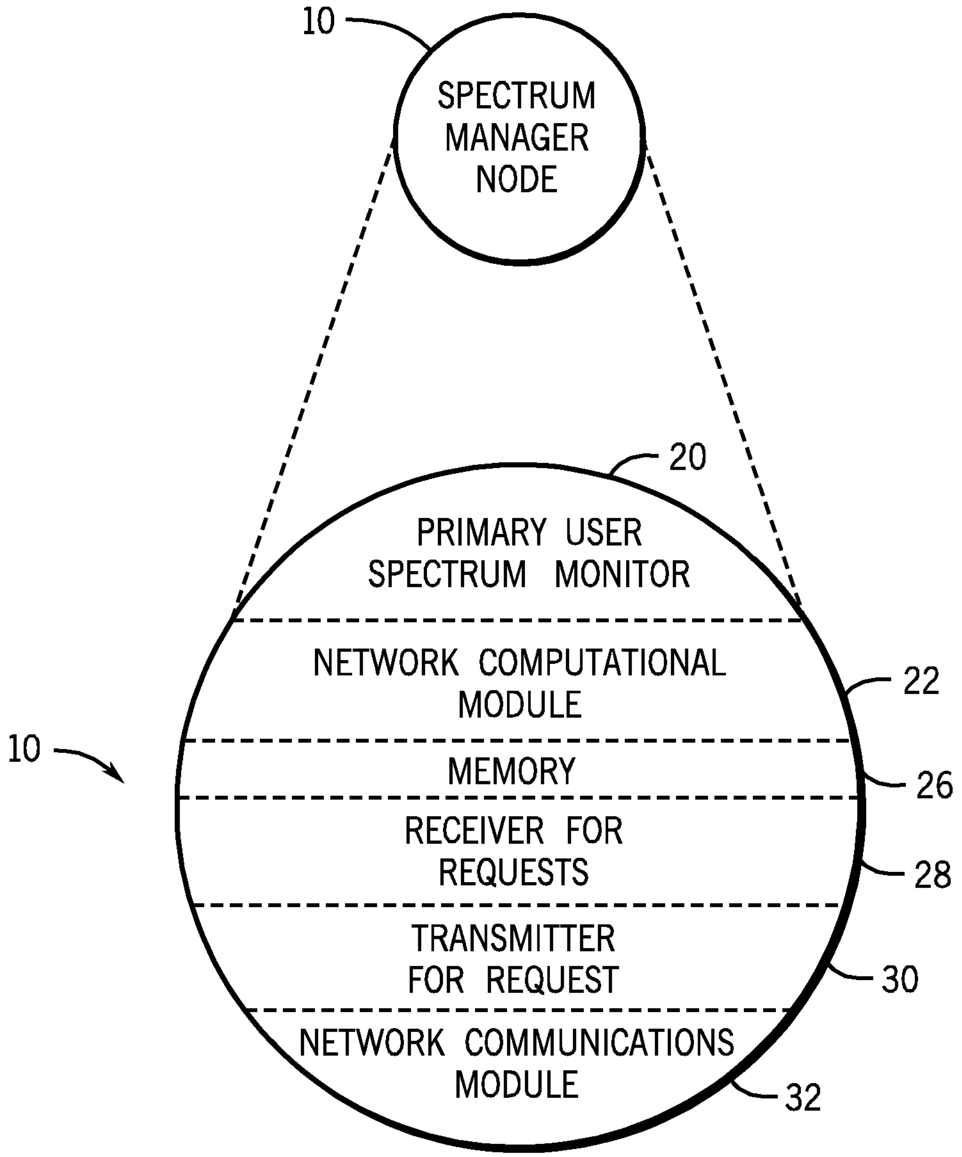
FIG. 2 is an exemplary spectrum manager node.

The present embodiments provide quiet spectrum monitoring and, in embodiments, temporary spectrum reassignment to one or more secondary users without interfering with a primary user's transmitting capabilities. A network of spectrum manager nodes may monitor radio spectrum in the respective geographic area of each manager node. An exemplary spectrum manager node 10 is illustrated in FIG. 2. The spectrum manager node may include one or more modules or units with specific functionality that may, in embodiments, be located on one or more processors.

For example, a spectrum manager node 10 may include a primary user spectrum monitor module 20 that monitors the spectrum for the presence of a transmission from a primary user. The spectrum monitor 20 may include both hardware and software components. In an embodiment, the spectrum monitor 20 may include one or more antennas and a tunable receiver under control of a microprocessor.

A network computational module 22 may provide computational services for requirements generated within the spectrum manager node 10 and may also provide computational services to requesters outside of the spectrum manager node. The spectrum manager node 10 may also include memory module 26 for storing information that may include frequency bands assigned to primary users in the geographic area within which the spectrum manager node 10 is located. The memory 26 may also store spectral and location resources, such as, power levels, location and mobility information and transmission requirements. Memory 26 may also provide memory storage functionality to service requesters outside of the geographic scope of the spectrum manager node 10. In such an embodiment, transmission information may be provided and stored in memory 26 of the spectrum manager node 10 to be accessed and broadcast at a time when spectrum is available.

Receiver module 28 may receive requests from non-primary users that wish to use quiet primary user spectrum. Transmitter module 30 responds to requests from non-primary users that wish to use quiet primary user spectrum. Network communications module 32 allows the spectrum manager node 10 to communicate with other spectrum manager nodes 10 in other geographic locations or to communicate with other control authorities. In one embodiment, the spectrum manager node 10 may identify, via a broadcast mode, those segments of spectrum that are quiet. The non-primary users may monitor the spectrum manager node 10, overseeing their area of operation, and may broadcast at will without negotiation with the spectrum manager node 10. Spectrum manager node 10 controls the transmitting non-primary user's broadcast and instructs the secondary user to cease transmission upon notification of transmission of a primary user.

Other embodiments may allow forwarding detection and request information though non-management nodes by secured management software on these nodes. In such an embodiment, a non-management node may include functionality for monitoring, memory, and network communication (e.g., spectrum monitor 20, memory 26, and network communications module 30), but may lack a receiver module 28 and/or a transmitter module 30.

In one embodiment, a spectrum manager node 10 may be configured to operate in a broadcast mode to provide information to secondary users about the availability of spectrum. In such an embodiment, a receiver for requests 28 may be optional, as the spectrum manager node 10 may monitor primary user transmissions and broadcast information about the available spectrum without handling/brokering secondary user requests. The broadcast may include an estimate of the available bandwidth and an estimate of available time for the available spectrum. In embodiments, the spectrum monitor 20 may store historical transmission data in memory 26 to determine historical usage data to provide time availability estimates. In one example, a primary band extending from 15 to 16 MHz may become quiet. A slice of 100 kHz may be available to a non-primary user to be used for 30 minutes between 7-8 PM. The message from the manager node 10 to the secondary user may indicate: "OK to transmit from 7:15-7:45 between 15.3 MHz-15.4 MHz." In one embodiment, an announcement or broadcast may be transmitted that indicates that an entire primary band is available.

In addition, the spectrum manager node 10 may update the broadcast to indicate a change in status of the available spectrum. For example, when a primary user begins transmitting, a spectrum manager node 10 may indicate a portion of the spectrum is no longer available. Alternatively, a broadcast may simply indicate a "not clear" or "busy" for unavailable portions of the spectrum. A lack of such message may be an indication of spectrum availability.

The transmission of spectrum information may be encrypted. In such an embodiment, only a secondary user who is a subscriber would possess the decryption information. In one embodiment, a device, e.g., a standalone device, may be programmed with the ability to decrypt transmissions from the spectrum manager node 10.

In embodiments, the spectrum manager node 10 may also monitor secondary user transmissions. For example, secondary users may transmit in a format or with a distinguishable signal that allows the spectrum monitor to determine which transmissions originate from primary versus secondary users. In an embodiment, the spectrum manager node 10 may also provide information about secondary usage of spectrum. In addition, a spectrum manager node 10 may indicate to secondary users to stop transmitting in particular blocks of spectrum or may transmit or store information about unauthorized secondary user spectrum usage during periods of primary user transmission.

Figure 3:
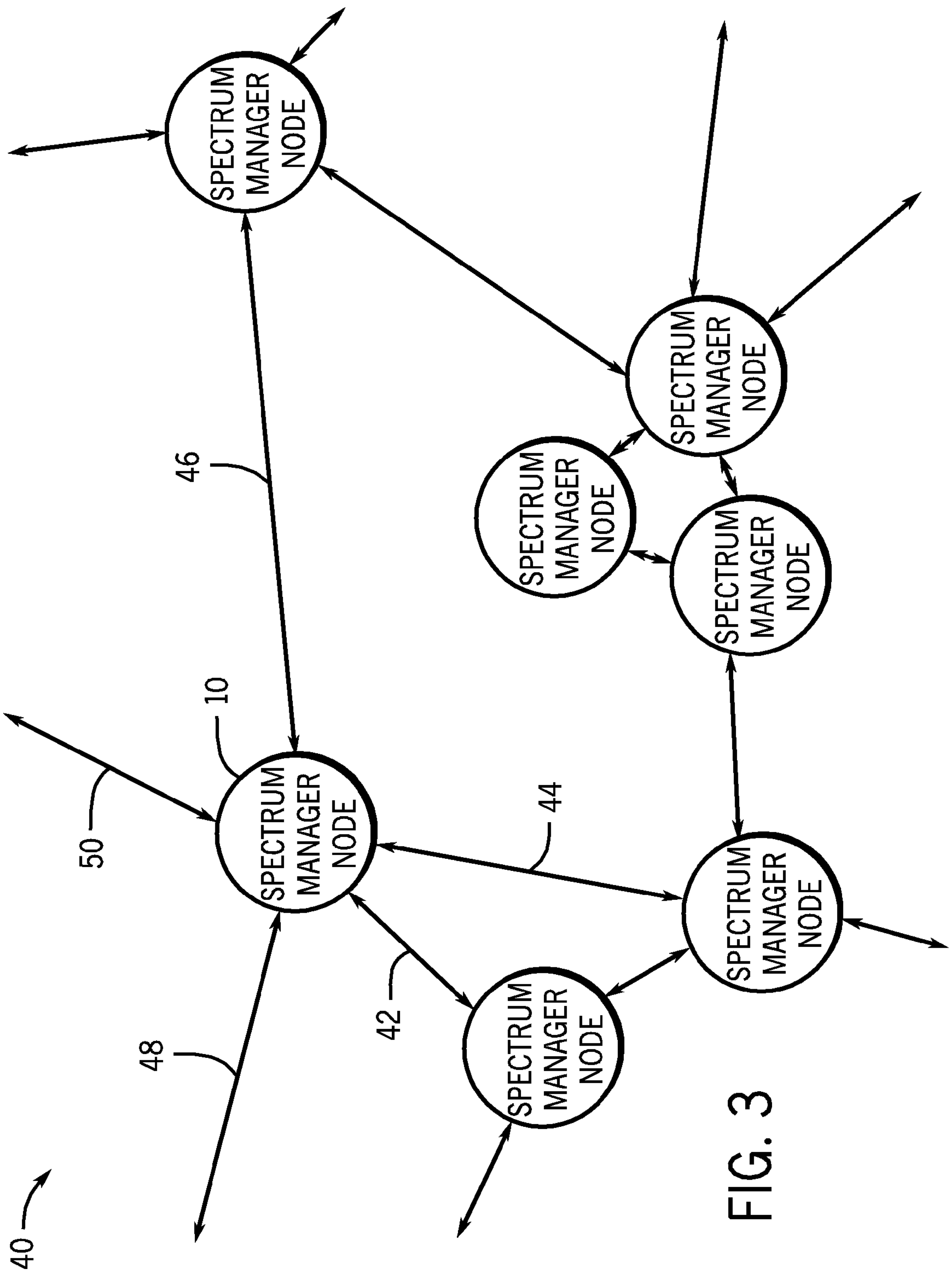
FIG. 3 is an exemplary mesh network of spectrum manager nodes.

A spectrum management system may include a plurality of spectrum manager nodes 10 that are connected in a network. In one embodiment, the interconnection network is a mesh network, such as a wireless mesh network 40, as illustrated in FIG. 3. An exemplary spectrum manager node 10*a* is shown as connected to other nodes 10*b*, 10*c*, and 10*d* by two-way communication paths 42, 44, and 46, respectively and to other nodes (not shown) by two-way communication paths 48 and 50.

The spectrum manager nodes 10 may be geographically located so that their monitoring receivers tile the primary user transmitter space such that there is at least one spectrum manager node 10 that will detect a transmission from any primary user transmitter. For example, to overcome the hidden node problem illustrated in FIG. 1, a primary user transmitter 110, which may otherwise not be detected by the non-primary user transmitter 130, may be detected by a spectrum manager node network 40. The network 40 may include at least one spectrum manager node 10 in such a geographic position as to be able to detect transmissions from the primary user transmitter 110. This may be accomplished by placing a spectrum manager node 10 at an altitude such that the spectrum manager node would have an unobstructed line-of-sight to the primary user transmitter 110.

Figure 4:
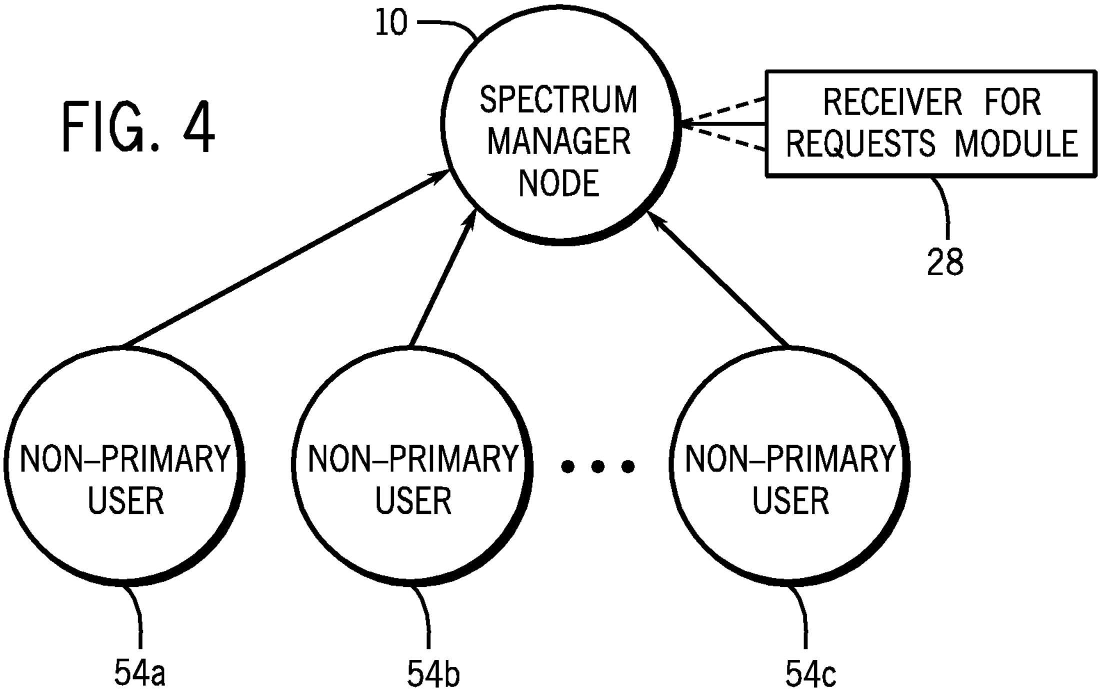
FIG. 4 shows an exemplary interaction between a receiver for requests of a spectrum manager node and non-primary users.

FIG. 4 illustrates an exemplary spectrum manager node 10 including a receiver for requests module 28. A spectrum manager node 10 may receive requests from any number of non-primary users (54*a*, 54*b*, or 54*c*, which may represent any number of non-primary users) to transmit in a primary user's spectrum. In one embodiment, the non-primary user requests may be handled by a multiple-access, many-to-one channel, such as an Industrial, Scientific, and Medical (ISM) spread spectrum channel. In another embodiment, a time-division channel or a frequency-division channel may be employed. In addition, a spectrum manager node 10 may transmit information about available spectrum in an ISM channel.

Figure 5:
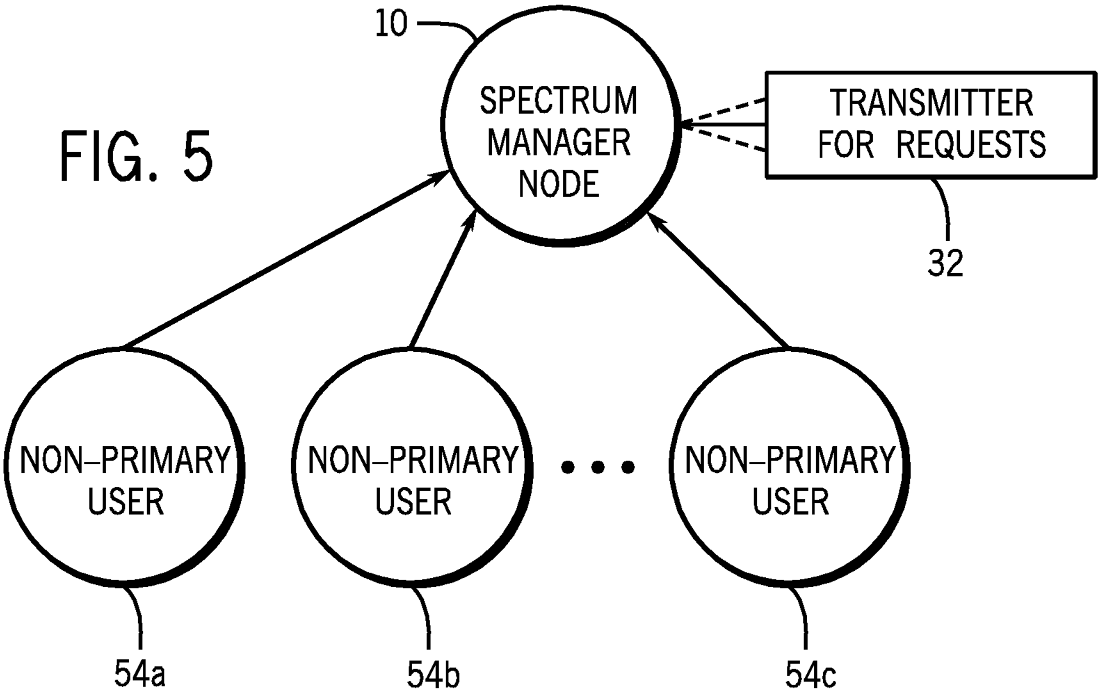
FIG. 5 shows an exemplary interaction between a transmitter for requests of a spectrum manager node and non-primary users.

FIG. 5 illustrates an exemplary communication channel from the spectrum manager node 10 to the non-primary users 54*a*, 54*b*, and 54*c* mediated by the transmitter for requests module 32. This channel is a one-to-many channel and serves to allocate timing, power, direction, and frequency schedules to the non-primary users in response to their requests for bandwidth. The channel also functions as an enforcement channel to require the non-primary users to immediately cease transmission should a primary user begin a transmission or if a receiver of a primary transmission should complain that their reception is interfered with. One embodiment of the one-to-many transmission channel is an ISM spread spectrum channel. In another embodiment, a time-division channel might be used. In yet another embodiment, a frequency-division channel might be used. In still yet another embodiment, wire lines may be used.

In an embodiment in which the requests are received by a non-primary node, i.e., the requests are received and then forwarded to a spectrum manager node 10, the non-primary node may provide information to the spectrum manager node 10 related to the requested resources such as Quality of Service (QoS) requirements (e.g., bandwidth, packet error rate), which will allow the spectral manager node to more efficiently allocate resources when the system becomes congested.

Figure 6:
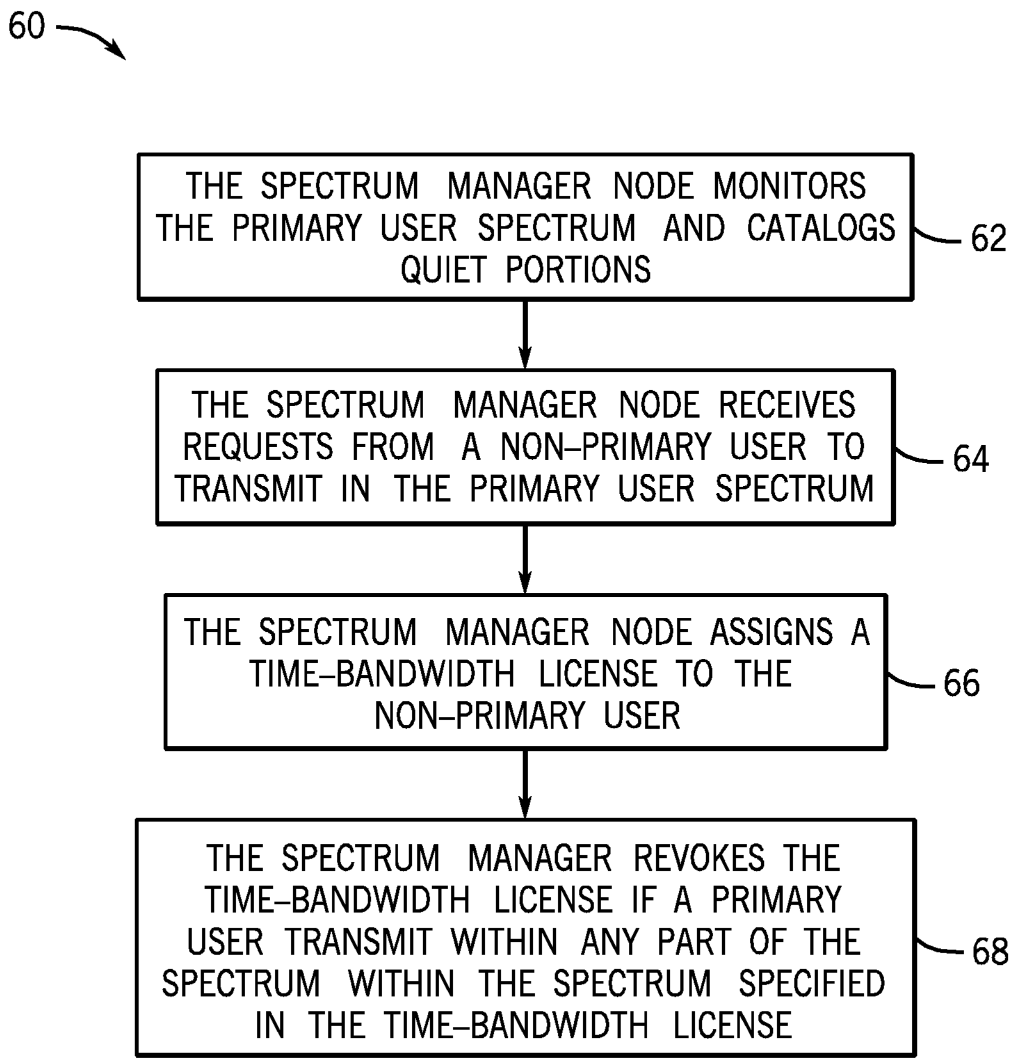
FIG. 6 is an exemplary flowchart of a spectrum manager node in operation.

An embodiment of the spectrum manager node 10 in operation is provided in FIG. 6 by flow chart 60. In step 62, the spectrum manager node 10 monitors the primary user spectrum and catalogs quiet portions, for example in memory 26. Control then passes to step 64, whereby the spectrum manager node 10 receives requests from a non-primary user to transmit in the primary user spectrum. In step 66, if the request is accepted by the primary user or meets certain preconditions provided by the primary user, the spectrum manager node 10 assigns a time-bandwidth license to the non-primary user. In step 68, the spectrum manager mode 10 may revoke the time-bandwidth license if a primary user transmits within any part of the spectrum specified in the time-bandwidth license. In embodiments, the time-bandwidth licenses may be created and administered by a separate spectrum brokerage service or may be part of the functionality provided by the spectrum manager node 10 or network 40. For example, an individual node 10 may forward the request to a central brokerage station interconnected to network 40.

In an embodiment, a primary user who is not using their assigned frequency band may generate an occasional transmission reservation sequence (TRS), which provides specific conditions and/or requirements for non-primary users. The TRS may instruct a temporarily authorized secondary user as to when they may use the frequency band. For example, the TRS may function as a time-bandwidth license. The terms and conditions of a TRS may be set by the primary users and range from an irrevocable time-bandwidth license to eminent domain whereby a primary user may revoke a TRS.

The TRS may be an item for brokerage and, as noted, such brokerage may be performed by the spectrum manager node network 40. In embodiments, the brokerage of a TRS may be run as an anonymous bidding or auction process. In such embodiments, the receiver for request 28 may forward requests from non-primary users to a brokerage module. Transactionally, it may also be operated in a publish/subscribe paradigm in which requests may be filtered for parameters such as bandwidth requirements, time requirements, and geographic requirements and forwarded only to the primary users that may reasonably fulfill the individual requests. In embodiments, primary users may set preconditions and only receive requests that fall within the preconditions.

In other embodiments, idle spectrum may be auctioned, and the auctions may be processed at each spectrum manager node 10. In one embodiment, spectrum that is assigned to one primary user may be aggregated with other available spectrum to create a wider band or simply to provide more spectrum for auction. In such a manner, each auction may include bandwidth from multiple primary users. An auction may include receiving requests (for example, via receiver for requests 28) from non-primary license holders interested in obtaining temporary bandwidth use. A node 10 may forward the requests to a primary license holder for consideration or may, in embodiments, be authorized to receive requests from multiple interested parties and auction all or a portion of predetermined available spectrum and act as a spectrum broker. In one embodiment, multiple primary users may collectively predetermine a reserve price for a portion of aggregated spectrum. If a receiver for requests 28 obtains an acceptable high bid within an auction time slot, the spectrum will be automatically reassigned with a time/bandwidth license.

Figure 7:
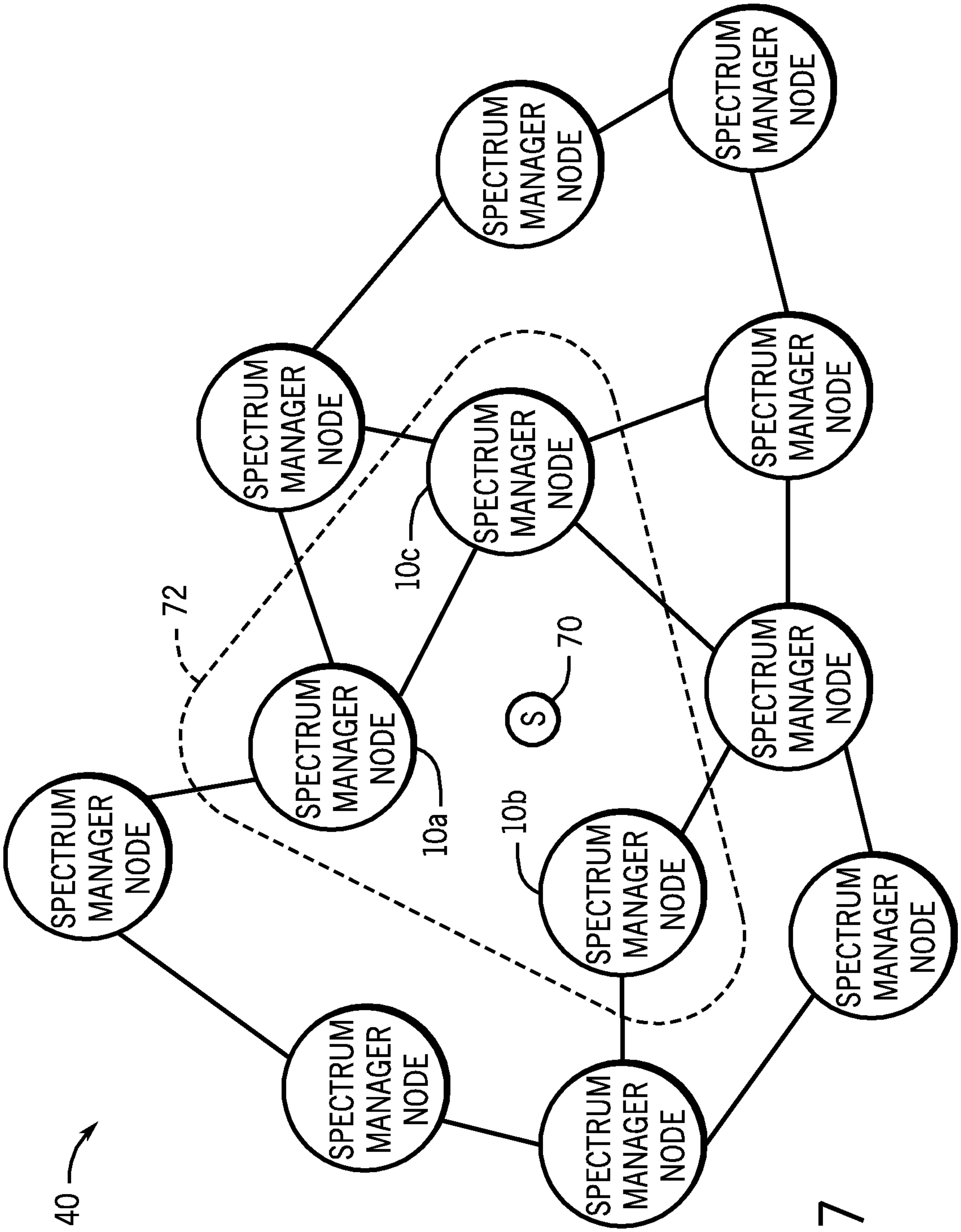
FIG. 7 shows an exemplary network of spectrum manager nodes with a perimeter defining a subset of the spectrum manager nodes.

In one embodiment, illustrated in FIG. 7, a secondary user 70 may wish to acquire a TRS from a node 10 located within a geographic region 72 that defines a subset of nodes 10*a*, 10*b*, and 10*c* within the network 40. Secondary user 70 negotiates with the spectrum manager node network 40 and the brokerage and associated computation is concluded by spectrum manager nodes within perimeter 72. The perimeter may be defined by the spectrum manager node network architect. The perimeter may, for example and not by way of limitation, be a function of expected propagation characteristics for transmissions originating from secondary user 70.

The structure, generation, and processing of the TRS may be designed so that there are options for encryption. The individual options for encryption are selectable by the spectrum manager node network architect. In one embodiment, the transmission reservation message (TRM) that carries the TRS may be wholly encrypted using a single keying variable cryptographic algorithm and require a potential secondary user to decrypt the TRM. Such decryption would be possible if and only if the potential secondary user had received the keying variable in advance from the spectrum manager node network manager through an application to the network manager. In another embodiment, the TRM may be sent in the clear and a potential secondary user may reply with a public key encrypted message sent through another channel such as unlicensed ISM spectrum. In this embodiment the potential secondary user may encrypt its bid for the time-bandwidth license. The potential secondary user may also include an identification number that would allow the bid to be anonymous and also to identify and entitle the winning applicant.

Figure 8:
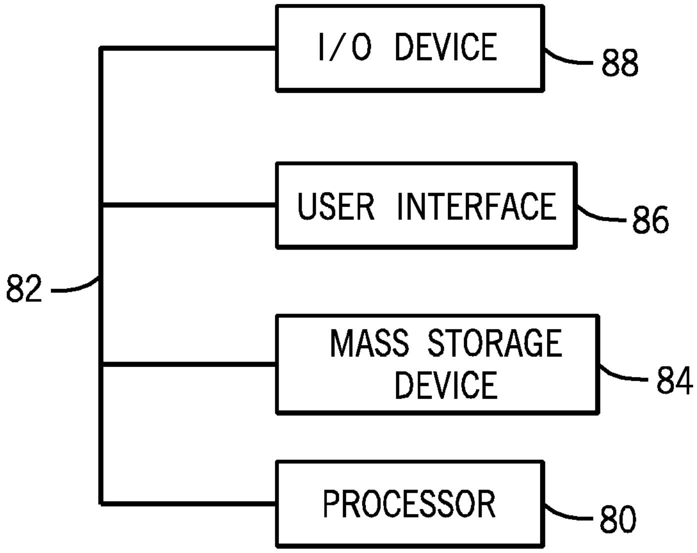
FIG. 8 is an exemplary hardware implementation of the present techniques.

FIG. 8 illustrates one embodiment of a hardware system intended to represent a broad category of computer systems such as personal computers, workstations, and/or embedded systems that may be used in conjunction with the present techniques. For example, the spectrum manager node 10 may incorporate one or more general purpose processors 80 and mass storage devices 84 coupled to a high speed bus 82 to perform the functionality of individual modules. In embodiments, the functions of several modules may be executed by a single processor 80. A user interface device 86 may also be coupled to the bus 82. User interface devices may include a display device, a keyboard, one or more external network interfaces, etc. An input/output device 88 may also be coupled to the bus 82.

Certain embodiments may include additional components, may not require all of the above components, or may combine one or more components. For instance, mass storage device 84 may be on-chip with processor 80. Additionally, the mass storage device 84 may include an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Additional components may include additional processors, a CD ROM drive, additional memories, and other peripheral components.

In one embodiment, the present techniques may be implemented using one or more computers such as the hardware system of FIG. 8. Where more than one computer is used, the systems can be coupled to communicate over an external network, such as a local area network (LAN), an internet protocol (IP) network, etc. In one embodiment, the techniques may be implemented as software routines executed by one or more execution units within the computer(s). For a given computer, the software routines can be stored on a storage device, such as mass storage device 84.

Figure 9:
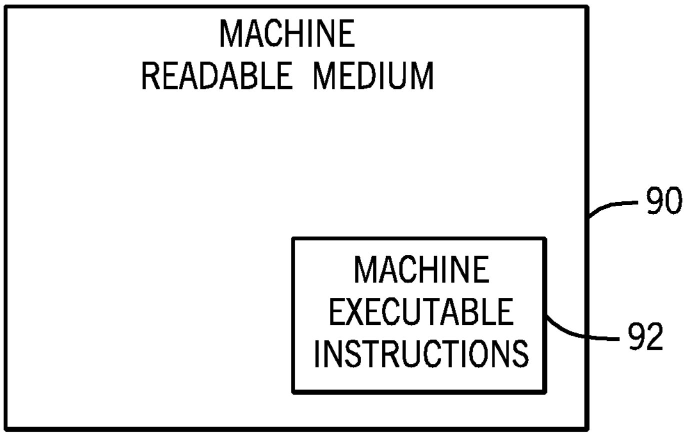
FIG. 9 is an exemplary software implementation of the present techniques.

As shown in FIG. 9, the software routines can be machine executable instructions 90 stored using any machine readable storage medium 92, such as a diskette, CD-ROM, magnetic tape, digital video or versatile disk (DVD), laser disk, ROM, Flash memory, etc. The series of instructions may be received from a remote storage device, such as a server on a network, a CD ROM device, a floppy disk, etc., through, for instance, I/O device(s) 88 of FIG. 8. From whatever source, the instructions may be copied from the storage device into memory 84 and then accessed and executed by processor 80. For example, machine-executable instructions for performing the functionality of the various modules of the spectrum manager node 10 may stored in machine-readable media or storage devices and accessed by processor 80.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:

continuously monitoring one or more primary user radio spectrums within a defined geographic area, wherein each of the one or more primary user radio spectrums is associated with a respective primary user;

determining whether any of the respective primary users are transmitting in their respective primary user radio spectrums;

if any of the respective primary users are not transmitting in their primary user radio spectrums, transmitting a signal to a plurality of eligible secondary users, wherein the signal comprises information relating to available spectrum within any of the primary user radio spectrums, wherein the available spectrum is available at-will to any of a plurality of eligible secondary users without confirmation from a spectrum manager;

receiving a secondary user signal from an eligible secondary user in the available spectrum; and transmitting a stop signal to the eligible secondary user when the available spectrum has a change in status and is being used by one of the respective primary users.

2. The method of claim 1, comprising monitoring the available spectrum to determine if any eligible secondary users are transmitting in the available spectrum.

3. The method of claim 1, wherein the information comprises an estimate of available bandwidth within specified frequency bounds of the available spectrum.

4. The method of claim 3, wherein the information comprises an estimate of available time comprising an estimated available starting time and an estimated stopping time for the available bandwidth.

5. The method of claim 1, wherein transmitting the signal comprises transmitting an encrypted signal.

6. The method of claim 1, wherein transmitting the signal comprises generating a signal in ISM band.

7. A system comprising:

a memory storing instructions configured to:

continuously monitor one or more primary user radio spectrums within a defined geographic area, wherein each of the one or more primary user radio spectrums is associated with a respective primary user;

determine whether any of the respective primary users are transmitting in their respective primary user radio spectrums;

transmit a signal to a plurality of eligible secondary users if any of the respective primary users are not transmitting in their primary user radio spectrums, wherein the signal comprises information relating to available spectrum within any of the primary user radio spectrums, wherein the available spectrum is available at-will to any of a plurality of eligible secondary users without confirmation from a spectrum manager;

receive a secondary user signal from an eligible secondary user in the available spectrum; and transmit a stop signal to the eligible secondary user when the available spectrum has a change in status and is being used by one of the respective primary users; and a processor configured to execute the instructions.

8. The system of claim 7, wherein the memory stores instructions configured to monitor the available spectrum to determine if any eligible secondary users are transmitting in the available spectrum.

9. The system of claim 7, wherein the information comprises an estimate of available bandwidth within specified frequency bounds of the available spectrum.

10. The system of claim 9, wherein the information comprises an estimate of available time comprising an estimated available starting time and an estimated stopping time for the available bandwidth.

11. The system of claim 7, wherein transmitting the signal comprises transmitting an encrypted signal.

12. The system of claim 7, wherein transmitting the signal comprises generating a signal in ISM band.

* * * * *